United States Patent
Harada et al.

(10) Patent No.: US 12,217,608 B2
(45) Date of Patent: Feb. 4, 2025

(54) VEHICLE DETECTION INFORMATION SHARING SYSTEM

(71) Applicant: SUBARU CORPORATION, Tokyo (JP)

(72) Inventors: Masaaki Harada, Tokyo (JP); Hisataro Iinami, Tokyo (JP); Ayaka Ohki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 308 days.

(21) Appl. No.: 17/375,669

(22) Filed: Jul. 14, 2021

(65) Prior Publication Data

US 2022/0028270 A1    Jan. 27, 2022

(30) Foreign Application Priority Data

Jul. 22, 2020   (JP) .................. 2020-125130

(51) Int. Cl.
*G08G 1/16* (2006.01)
*G06T 7/70* (2017.01)
(Continued)

(52) U.S. Cl.
CPC .............. *G08G 1/162* (2013.01); *G06T 7/70* (2017.01); *G06V 20/58* (2022.01); *G08G 1/0112* (2013.01);
(Continued)

(58) Field of Classification Search
CPC . G06T 2207/30261; G06T 7/70; G06V 20/58; G08G 1/0112; G08G 1/0116;
(Continued)

(56) References Cited

U.S. PATENT DOCUMENTS 6,246,932 B1 *  6/2001  Kageyama ........... G05D 1/0297
                                                             701/50
10,147,320 B1 * 12/2018  Ellis ..................... G01S 17/931
(Continued)

FOREIGN PATENT DOCUMENTS

JP    2006-178673 A    7/2006
JP    2006-209333 A    8/2006
(Continued)

OTHER PUBLICATIONS

Notice of Reasons for Refusal received in corresponding Japanese Patent Application No. 2020-125130, dated Jan. 23, 2024.

*Primary Examiner* — Thomas Ingram
*Assistant Examiner* — Michael J Herrera
(74) *Attorney, Agent, or Firm* — Rimon P.C.

(57) ABSTRACT

A vehicle detection information sharing system includes a detection information acquiring unit, a vehicle information acquiring unit, a risk degree calculator, and an information transmitter. The detection information acquiring unit is configured to acquire detection information on an obstacle detected by a first vehicle traveling on a road. The vehicle information acquiring unit is configured to acquire vehicle information on a second vehicle traveling on the road. The risk degree calculator is configured to calculate a risk degree on the basis of the detection information and the vehicle information. The risk degree is a degree of risk that arises between the second vehicle and the obstacle. The information transmitter is configured to transmit, to the second vehicle, risk avoidance information corresponding to the risk degree.

11 Claims, 8 Drawing Sheets

(51) Int. Cl.
*G06V 20/58* (2022.01)
*G08G 1/01* (2006.01)
*H04L 67/12* (2022.01)

(52) U.S. Cl.
CPC ........... *G08G 1/0116* (2013.01); *G08G 1/166* (2013.01); *H04L 67/12* (2013.01); *G06T 2207/30261* (2013.01)

(58) Field of Classification Search
CPC ........ G08G 1/162; G08G 1/164; G08G 1/165; G08G 1/166; H04L 67/12; H04W 4/025; H04W 4/40; H04W 4/90
See application file for complete search history.

(56) References Cited

U.S. PATENT DOCUMENTS

| | | | | |
|---|---|---|---|---|
| 10,235,886 | B1* | 3/2019 | Baughman | B60R 19/18 |
| 10,558,224 | B1* | 2/2020 | Lin | G08G 1/165 |
| 10,691,137 | B2* | 6/2020 | Kim | G08G 1/166 |
| 10,745,028 | B2* | 8/2020 | Tao | G08G 1/056 |
| 2008/0238056 | A1* | 10/2008 | Kobayashi | B60R 21/0132 280/735 |
| 2011/0190972 | A1* | 8/2011 | Timmons | G08G 1/167 701/31.4 |
| 2013/0147955 | A1 | 6/2013 | Oosugi | |
| 2015/0035685 | A1* | 2/2015 | Strickland | B60Q 9/008 340/901 |
| 2016/0335892 | A1* | 11/2016 | Okada | G08G 1/123 |
| 2016/0355181 | A1 | 12/2016 | Morales Teraoka et al. | |
| 2016/0357187 | A1* | 12/2016 | Ansari | G06T 19/003 |
| 2017/0243485 | A1* | 8/2017 | Rubin | H04W 4/46 |
| 2018/0086346 | A1* | 3/2018 | Fujisawa | G08G 1/166 |
| 2019/0012912 | A1* | 1/2019 | Kim | G08G 1/096716 |
| 2019/0027036 | A1* | 1/2019 | Mishina | B60W 30/09 |
| 2019/0071072 | A1* | 3/2019 | Seo | B60W 30/18163 |
| 2019/0179323 | A1* | 6/2019 | Ewert | G08G 1/166 |
| 2020/0017117 | A1* | 1/2020 | Milton | G08G 1/0112 |
| 2020/0047668 | A1* | 2/2020 | Ueno | G08G 1/166 |
| 2020/0074862 | A1* | 3/2020 | Johnston | G08G 1/22 |
| 2020/0079368 | A1* | 3/2020 | Yamada | B60W 50/14 |
| 2020/0090512 | A1* | 3/2020 | Amacker | H04W 76/14 |
| 2020/0133288 | A1* | 4/2020 | Abari | G05D 1/0088 |
| 2020/0160714 | A1* | 5/2020 | Inaba | G08G 1/166 |
| 2020/0207371 | A1* | 7/2020 | Dougherty | B60W 60/0017 |
| 2021/0101609 | A1* | 4/2021 | Kim | G06F 18/256 |
| 2021/0150922 | A1* | 5/2021 | Kanagarajan | H04L 67/12 |
| 2021/0276589 | A1* | 9/2021 | Zhu | B60W 30/0956 |
| 2021/0281968 | A1* | 9/2021 | Kurehashi | H04W 4/90 |

FOREIGN PATENT DOCUMENTS

| | | |
|---|---|---|
| JP | 2013-122714 A | 6/2013 |
| JP | 2018-195159 A | 12/2018 |
| JP | 6481520 B2 | 3/2019 |
| JP | 2020-042553 A | 3/2020 |

* cited by examiner

| PARAMETER | FACTOR DETERMINED AS CAUSING HIGH RISK |
|---|---|
| POSITION RELATIVE TO OBSTACLE | CLOSE (BECAUSE VEHICLE IS CLOSE TO OBSTACLE) |
| SPEED | FAST (BECAUSE MARGIN TIME BEFORE AVOIDANCE ACTION IS SHORT) |
| VEHICLE WEIGHT | HEAVY (BECAUSE BRAKING DISTANCE IS LONG) |
| MODEL YEAR OF VEHICLE | OLD (BECAUSE BRAKE PERFORMANCE IS LOW AND BRAKING DISTANCE IS LONG) |
| PRESENCE OR ABSENCE OF ANOTHER SURROUNDING VEHICLE | PRESENT (BECAUSE AVOIDANCE DIRECTION IS LIMITED) |

VEHICLE DETECTION INFORMATION SHARING SYSTEM

CROSS-REFERENCE TO RELATED APPLICATIONS

The present application claims priority from Japanese Patent Application No. 2020-125130 filed on Jul. 22, 2020, the entire contents of which are hereby incorporated by reference.

BACKGROUND

The technology relates to a vehicle detection information sharing system. A vehicle driving assistance apparatus that avoids risk such as contact with a movable obstacle (e.g., an animal) on a road has been known. For example, Japanese Patent No. 6481520 discloses a vehicle driving assistance apparatus that acquires an image around a vehicle, predicts a type or an action of the animal from the acquired image, determines the possibility of contact of the animal with the vehicle on the basis of a prediction result of a future presence area of the animal, and performs a process of assisting avoidance of contact upon determining that there is a possibility of contact.

For example, Japanese Unexamined Patent Application Publication (JP-A) No. 2018-195159 discloses an information processing apparatus that is mountable on a vehicle, acquires information on a person and another vehicle positioned around the vehicle, estimates a risk level of contact with the person and the other vehicle on the basis of the acquired information, and executes a notification process toward surroundings of the vehicle in a case where the estimated contact risk level satisfies a criterion.

SUMMARY

An aspect of the technology provides a vehicle detection information sharing system including a detection information acquiring unit, a vehicle information acquiring unit, a risk degree calculator, and an information transmitter. The detection information acquiring unit is configured to acquire detection information on an obstacle detected by a first vehicle traveling on a road. The vehicle information acquiring unit is configured to acquire vehicle information on a second vehicle traveling on the road. The risk degree calculator is configured to calculate a risk degree on the basis of the detection information and the vehicle information. The risk degree is a degree of risk that arises between the second vehicle and the obstacle. The information transmitter is configured to transmit, to the second vehicle, risk avoidance information corresponding to the risk degree.

An aspect of the technology provides a vehicle detection information sharing system including circuitry. The circuitry is configured to acquire detection information on an obstacle detected by a first vehicle traveling on a road. The circuitry is further configured to acquire vehicle information on a second vehicle traveling on the road. The circuitry is further configured to calculate a risk degree on the basis of the detection information and the vehicle information. The risk degree is a degree of risk that arises between the first vehicle and the obstacle. The circuitry is further configured to transmit, to the first vehicle, risk avoidance information corresponding to the risk degree.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

According to the technique (hereinafter also referred to as a first technique) disclosed in Japanese Patent No. 6481520, the own vehicle that has acquired an image of the movable obstacle is able to avoid risk, such as contact with the movable obstacle, under the control of the vehicle driving assistance. However, there may be another vehicle without such a vehicle driving assistance apparatus, and another vehicle including such a vehicle driving assistance apparatus but has not acquired an image of the movable obstacle. It is difficult for such other vehicles to effectively take an action of avoiding the risk, such as contact, even upon entering a presence area of the movable obstacle whose image has been acquired by the own vehicle.

As with the technique (hereinafter also referred to as a second technique) disclosed in JP-A No. 2018-195159, under vehicle-to-vehicle (V2V) communication or vehicle-to-everything (V2X) communication, studies have been made on estimating, on the basis of information acquired by one vehicle, a risk level of another vehicle, and notifying the other vehicle of the estimated risk level. However, in a case where a target of risk avoidance is a movable obstacle, for example, a level of risk varies depending on factors including a future position after movement of the obstacle and a speed of the vehicle to be the risk target. The second technique performs the notification process toward the other vehicle on the basis of mere presence or absence of a contact risk level, and it is difficult for the notified vehicle to perform an appropriate reaction corresponding to the level of risk.

In a case where a movable obstacle, such as an animal, is the risk target, it is difficult to predict the future position, which can cause two or more vehicles to be subjected to risk. However, the second technique does not assume a case where two or more other vehicles to be notified are present, and it is difficult to perform appropriate priority setting corresponding to the level of risk in a situation with limitations on communication lines.

It is desirable to make it possible to, when the own vehicle detects a movable obstacle on a road, share detection information with other vehicles, and provide another vehicle subjected to risk by the detected movable obstacle with effective information corresponding to a level of the risk.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1:
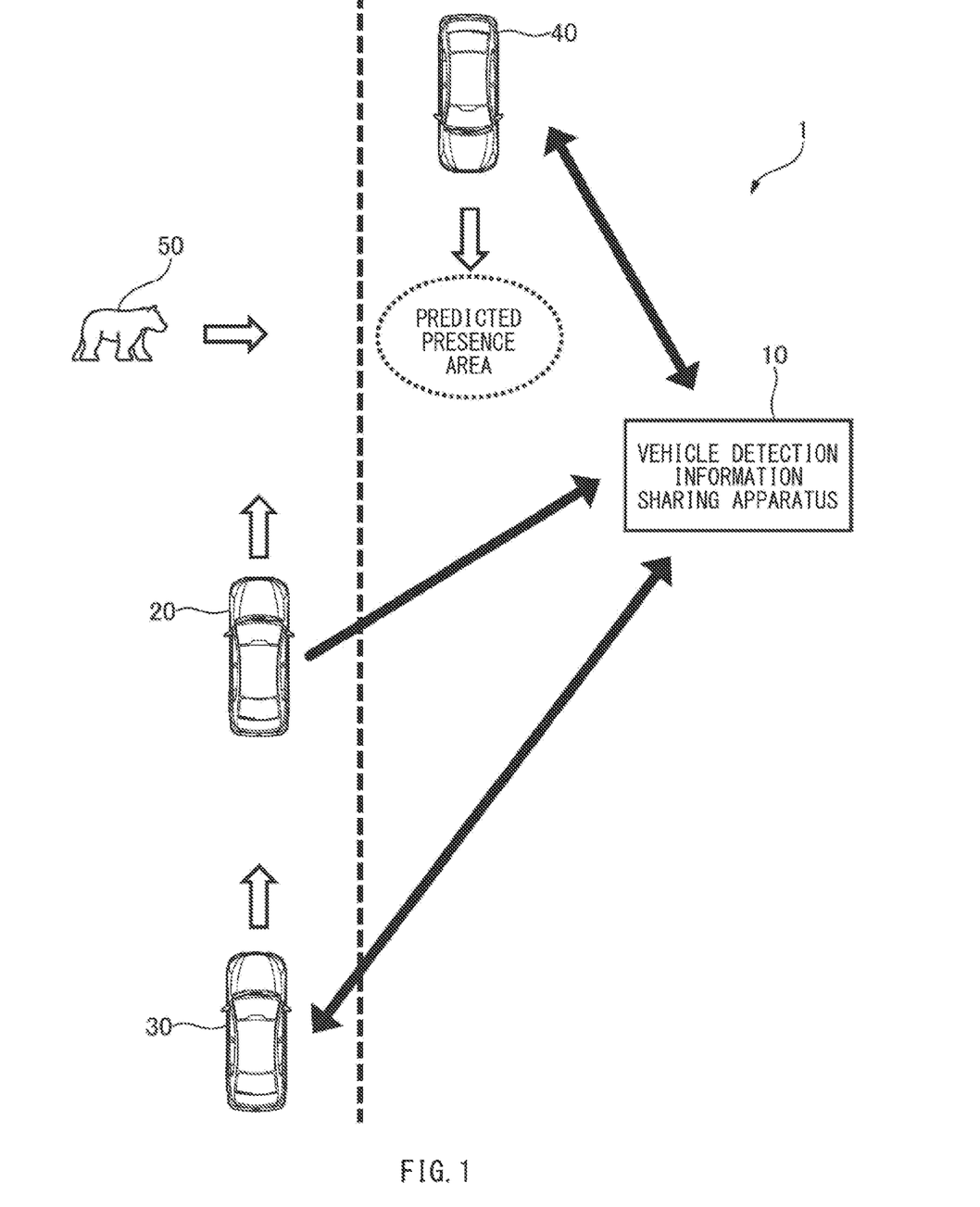
FIG. 1 is an explanatory diagram illustrating an outline configuration of a vehicle detection information sharing system according to one example embodiment of the technology.

A vehicle detection information sharing system 1 according to an example embodiment of the technology may include a vehicle detection information sharing apparatus 10, as illustrated in FIG. 1. The vehicle detection information sharing apparatus 10 may implement the vehicle detection information sharing system 1 by acquiring various types of information detected by one vehicle 20 traveling on a road, and transmitting information obtained on the basis of the various types of information to other vehicles 30 and 40, for example. The example embodiment describes, for example, the vehicle detection information sharing system 1 that shares, with the other vehicles 30 and 40, detection information related to an obstacle on a road and acquired by the one vehicle 20.

The vehicle detection information sharing apparatus 10 may be configured by, for example, a cloud server to be coupled to the vehicles 20, 30, and 40 via communication lines, or may be configured by a control apparatus provided in a vehicle and configured to mutually communicate with two or more vehicles.

Figure 2:
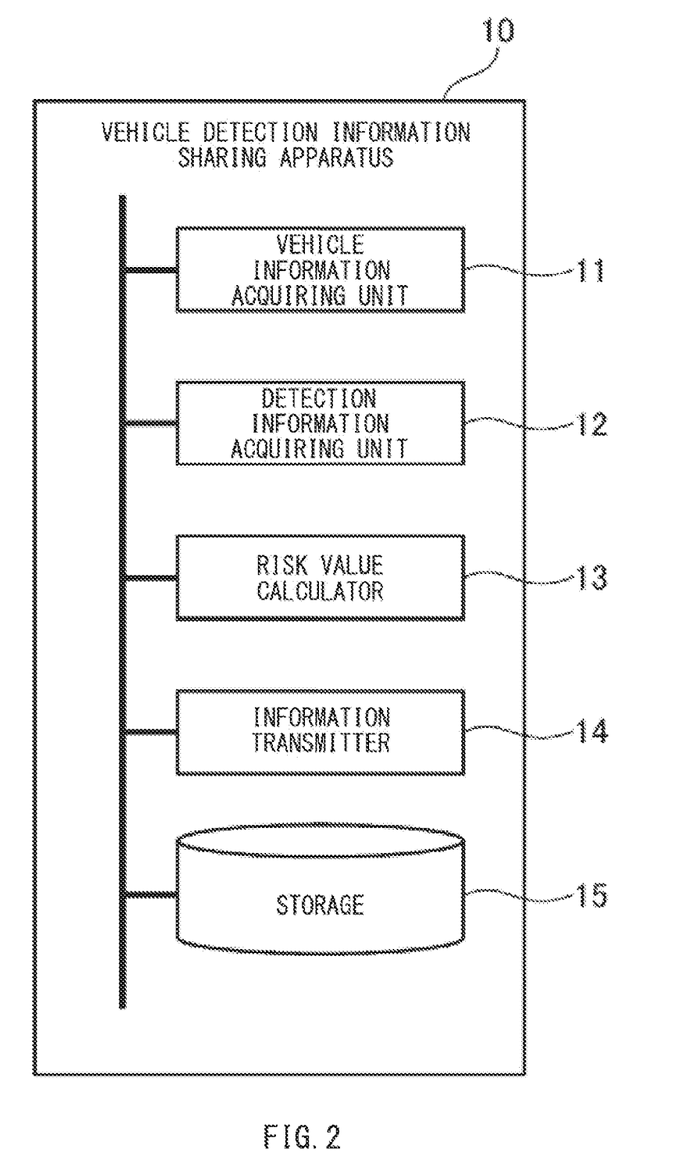
FIG. 2 is a block diagram illustrating an outline configuration of a vehicle detection information sharing apparatus to be applied to the vehicle detection information sharing system according to one example embodiment of the technology.

As illustrated in FIG. 2, the vehicle detection information sharing apparatus 10 may include a detection information acquiring unit 12, a vehicle information acquiring unit 11, a risk value calculator 13, an information transmitter 14, and a storage 15.

In the example illustrated in FIG. 1, the detection information acquiring unit 12 acquires detection information on an obstacle 50 detected by the one vehicle 20 traveling on a road. Note that the obstacle 50 may include a movable obstacle, such as an animal, as well as an obstacle fixed onto the road. The detection information may include at least one of a feature of the obstacle, a position of the obstacle on the road, or surrounding information of the position. In one example, an image captured by an onboard camera of the vehicle 20 to include the obstacle on the road on which the vehicle 20 is traveling and surroundings thereof may be used as the detection information.

The vehicle information acquiring unit 11 acquires vehicle information from each of the other vehicles 30 and 40 present within a range including the vehicle 20 or the obstacle 50 detected by the vehicle 20. As the vehicle information, for example, at least one of a position, a velocity vector, a vehicle type, a size, or a weight of the other vehicle may be used. Although two vehicles are illustrated as the other vehicles 30 and 40 in the illustrated example, the "other vehicle" may be one vehicle or three or more vehicles.

The risk value calculator 13 calculates a risk value indicating a risk degree for each vehicle, on the basis of the detection information acquired from the vehicle 20 and the vehicle information acquired from the other vehicles 30 and 40. The risk degree may be a degree of risk that arises between each of the other vehicles 30 and 40 and the obstacle 50.

Detailed description is given below on the calculation of the risk value by the risk value calculator 13. In one embodiment, the risk value calculator 13 may serve as a "risk degree calculator". The risk value calculator 13 may generate, on the basis of the detection information, on-road risk information related to on-road risk attributable to the obstacle 50 being present on the road. The risk value calculator 13 may also generate, on the basis of the vehicle information, vehicle risk information specific to the other vehicles and attributable to features of the other vehicles 30 and 40 and positions of the other vehicles 30 and 40 on the road. The risk value calculator 13 may use the on-road risk information and the vehicle risk information to calculate the risk value. This makes it possible to calculate the risk value that is the risk degree for each vehicle.

(i) On-Road Risk Information

In a case where the obstacle 50 is a movable obstacle, such as an animal, the risk degree of contact between the other vehicles 30 and 40 and the obstacle 50, for example, may change depending on a behavior of the movable obstacle. Hence, the risk value calculator 13 may generate the on-road risk information to include information related to a predicted presence area. The predicted presence area may include a predicted future position of the movable obstacle.

Note that, in the vehicle detection information sharing apparatus 10, the storage 15 to be described later may be caused to hold a map, such as a dynamic map, in advance, and the on-road risk information may be reflected in the map.

(ii) Vehicle Risk Information

Figure 3:
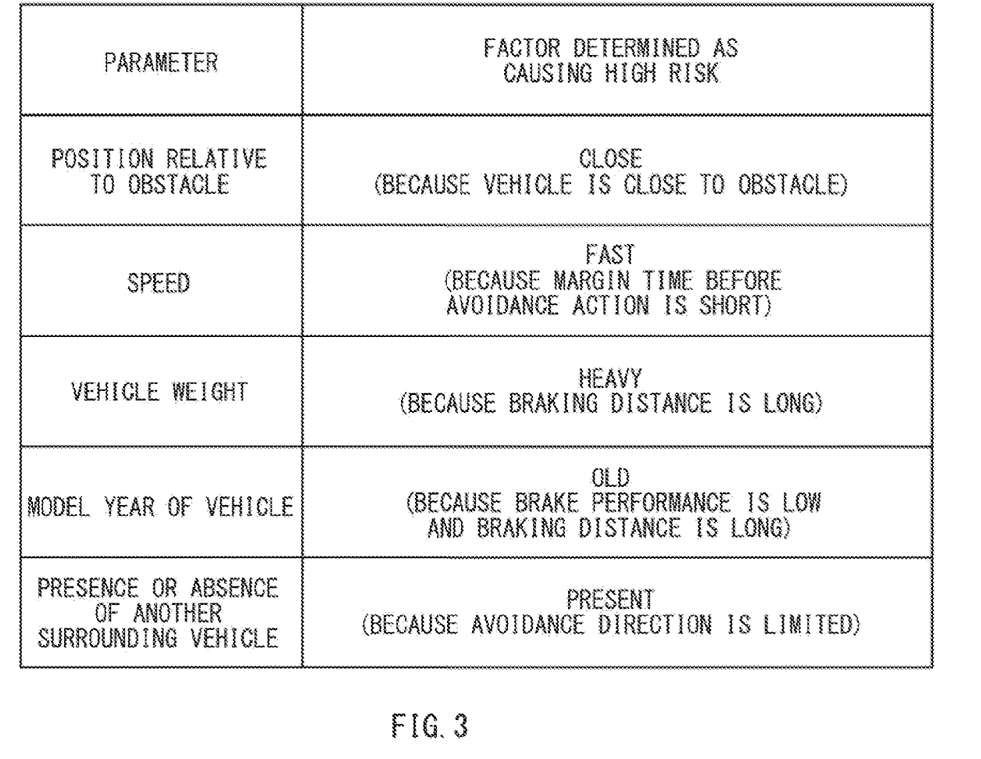
FIG. 3 is a table illustrating the relationship between parameters and a factor determined as causing high risk for each parameter in generation of vehicle risk information.

The other vehicles 30 and 40 may differ from each other in, for example, the degree of risk with the obstacle 50 and a measure to be taken to avoid the risk, depending on a position of each of the other vehicles 30 and 40 relative to the obstacle 50, a speed (e.g., a velocity vector), a vehicle weight, and a model year of each of the other vehicles 30 and 40, and presence or absence of another vehicle traveling around each of the other vehicles 30 and 40. Hence, as illustrated in a table of FIG. 3, the vehicle risk information may be generated by using, as parameters, the position of each of the other vehicles 30 and 40 relative to the obstacle 50, the speed (e.g., the velocity vector), the vehicle weight, and the model year of each of the other vehicles 30 and 40, and the presence or absence of another vehicle traveling around each of the other vehicles 30 and 40.

The information transmitter 14 transmits, to the other vehicles 30 and 40, risk avoidance information corresponding to the risk value calculated by the risk value calculator 13. For example, the risk avoidance information may be stored in the storage 15 in advance in association with the risk value, and the information transmitter 14 may transmit the risk avoidance information by selecting the risk avoidance information corresponding to the risk value.

Figure 4:
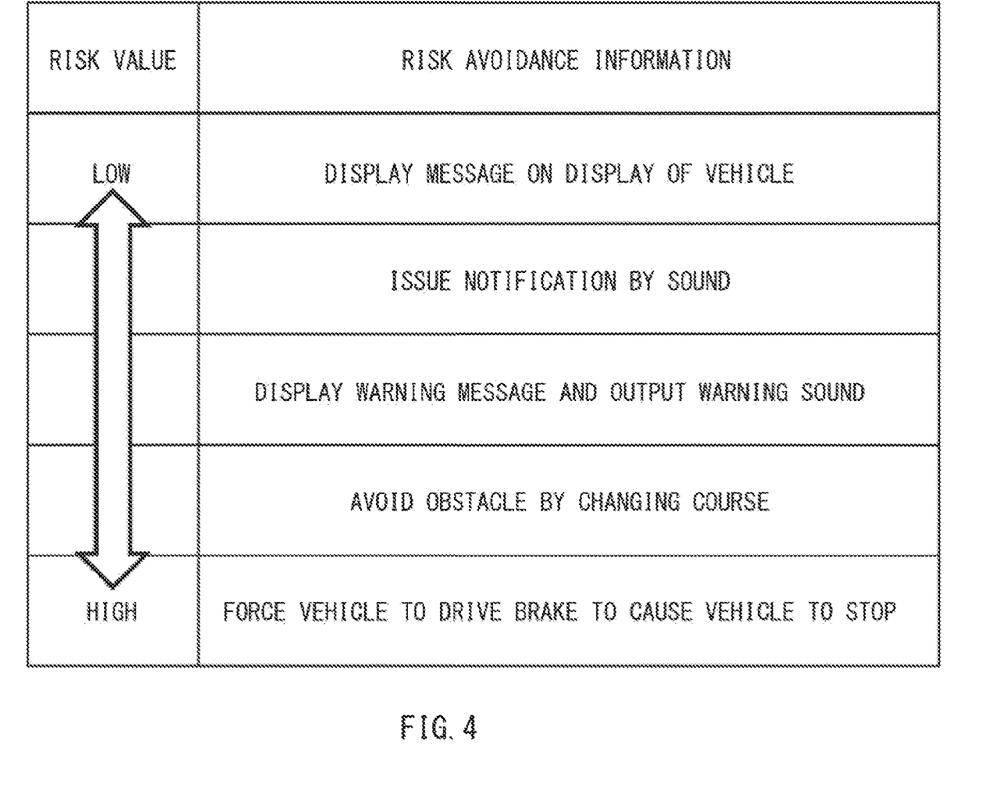
FIG. 4 is a table illustrating the relationship between a risk value and risk avoidance information.

For example, as illustrated in a table of FIG. 4, information to be used to force the other vehicles 30 and 40 to drive a brake to cause the other vehicles to stop may be associated as the risk avoidance information in a case where the risk value is high. Information to be used to cause a display, for example, mounted on each of the other vehicles 30 and 40 to display a message may be associated as the risk avoidance information in a case where the risk value is low.

Thus, the information transmitter 14 may transmit, in accordance with a level of the risk value, information of which a driver is to be notified as information for avoidance of risk caused by the obstacle. The notification may be issued by causing the display to display a warning message, for example, or by causing warning sound or predetermined voice to be outputted. In a case where the risk value is high, for example, the information transmitter 14 may transmit, as the risk avoidance information, information to be used to automatically control the vehicle. As described above, it is possible for the information transmitter 14 to transmit, in accordance with the risk value, optimum information for the vehicle to avoid the risk caused by the obstacle.

In the other vehicles 30 and 40, the other vehicles 30 and 40 may be automatically controlled or a predetermined message, for example, may be displayed to attract the attention of the driver, on the basis of the risk avoidance information acquired from the information transmitter 14.

The risk avoidance information may be transmitted to the other vehicles 30 and 40 at the same time. Alternatively, for example, the risk avoidance information may be transmitted earlier to the vehicle for which the risk value is higher, out of the other vehicles 30 and 40.

The storage 15 may store a program and various data to be used for arithmetic processing performed by the units described above. For example, the storage 15 may be caused to store the risk avoidance information in association with the risk value. The storage 15 may be caused to store, in advance, information related to vehicle features, including a vehicle weight and a size, for each vehicle type.

A process flow in the vehicle detection information sharing system configured as described above will now be described with reference to flowcharts of FIG. 5 to FIG. 7.

Figure 5:
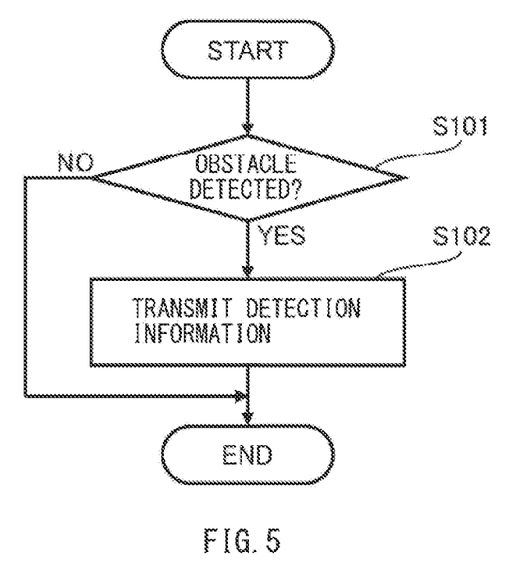
FIG. 5 is a flowchart illustrating a process flow in a vehicle that detects an obstacle.

FIG. 5 is a flowchart illustrating a process performed by the vehicle 20. The vehicle 20 may determine whether the obstacle 50 has been detected during traveling (step S101). Upon determining that the obstacle 50 has been detected during traveling (step S101; YES), the vehicle 20 may capture an image including the obstacle and surroundings thereof with an onboard camera, for example, transmit the image to the vehicle detection information sharing apparatus 10 as detection information (step S102), and bring the process to an end. Upon determining that the obstacle 50 has not been detected during traveling (step S101; NO), the vehicle 20 may bring the process to an end.

Figure 6:
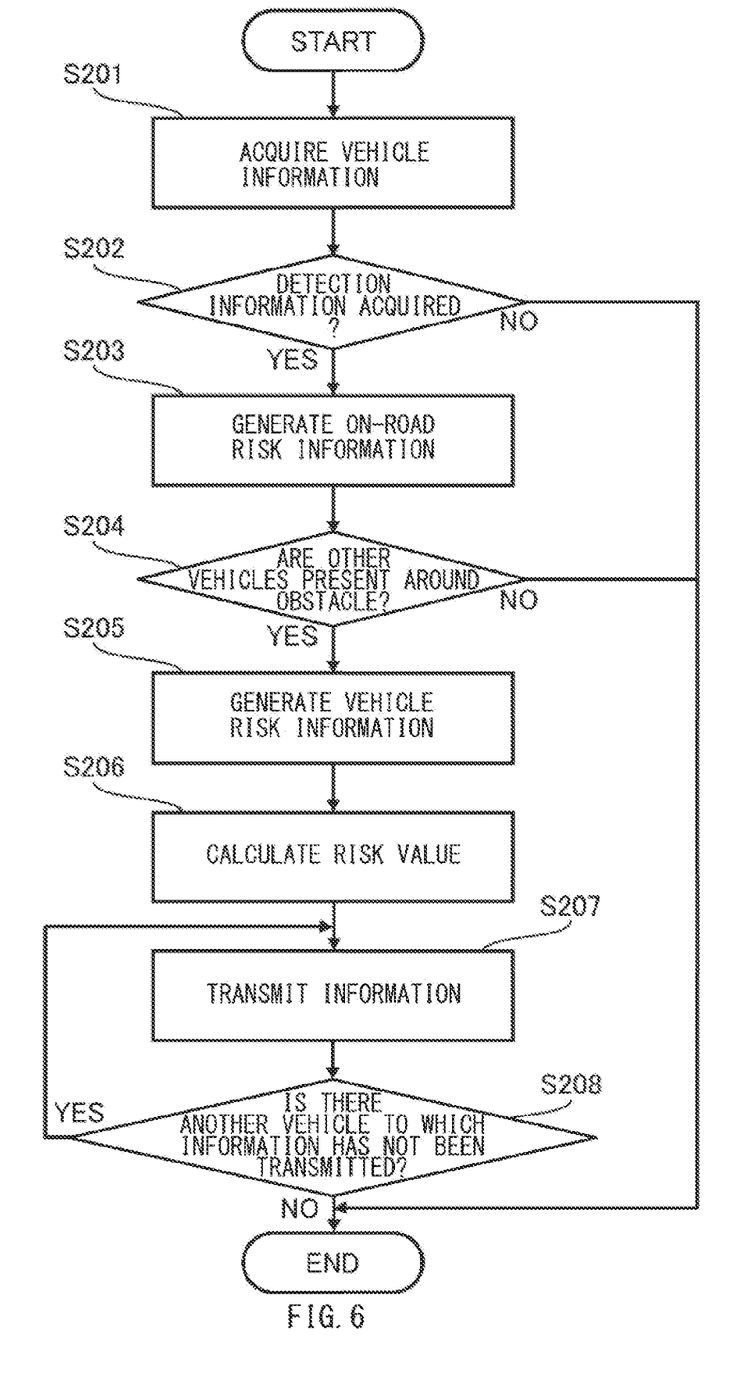
FIG. 6 is a flowchart illustrating a process flow in the vehicle detection information sharing apparatus.

FIG. 6 is a flowchart illustrating a process performed by the vehicle detection information sharing apparatus 10. In the vehicle detection information sharing apparatus 10, the vehicle information acquiring unit 11 may acquire vehicle information from the other vehicles 30 and 40 (step S201).

Next, the vehicle detection information sharing apparatus 10 may determine whether the detection information acquiring unit 12 has acquired detection information (step S202). Upon determining that the detection information acquiring unit 12 has not acquired detection information (step S202; NO), the vehicle detection information sharing apparatus 10 may bring the process to an end. If the vehicle detection information sharing apparatus 10 determines that the detection information acquiring unit 12 has acquired detection information (step S202; YES), next, the risk value calculator 13 may generate on-road risk information on the basis of the detection information (step S203).

Next, the risk value calculator 13 may determine, referring to the on-road risk information, whether the other vehicles 30 and 40 are present around the current position or the predicted presence area of the obstacle (step S204). Upon determining that the other vehicles 30 and 40 are absent (step S204; NO), the vehicle detection information sharing apparatus 10 may bring the process to an end. Upon determining that the other vehicles 30 and 40 are present (step S204; YES), next, the risk value calculator 13 may generate vehicle risk information on the corresponding vehicle (step S205).

Thereafter, the risk value calculator 13 may use the on-road risk information and the vehicle risk information to calculate a risk value for each of the other vehicles (step S206). The information transmitter 14 may transmit risk avoidance information corresponding to the risk value to the other vehicle (step S207). Next, the vehicle detection information sharing apparatus 10 may determine whether there is a vehicle to which risk avoidance information has not been transmitted (step S208). Upon determining that there is no vehicle to which risk avoidance information has not been transmitted (step S208; NO), the vehicle detection information sharing apparatus 10 may bring the process to an end. Upon determining that there is a vehicle to which risk avoidance information has not been transmitted (step S208; YES), the vehicle detection information sharing apparatus 10 may cause the process to return to step S207.

Figure 7:
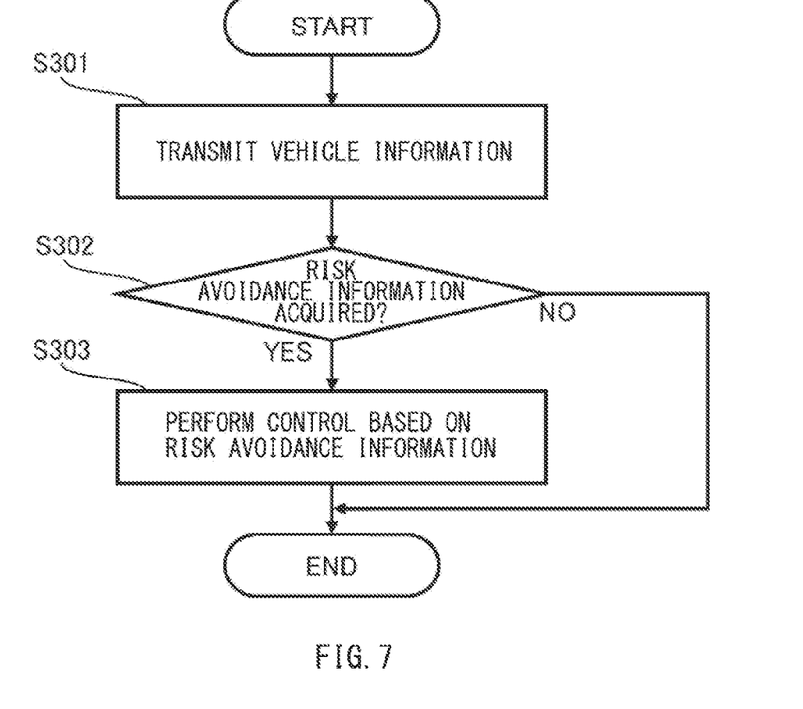
FIG. 7 is a flowchart illustrating a process flow in another vehicle.

FIG. 7 is a flowchart illustrating a process performed by the other vehicles 30 and 40. The other vehicles 30 and 40 may transmit vehicle information on the own vehicle to the vehicle detection information sharing apparatus 10 during traveling (step S301). The vehicle information may be transmitted on a regular basis at a predetermined time interval from the other vehicles 30 and 40 to the vehicle detection information sharing apparatus 10. Alternatively, for example, in a case where the other vehicles 30 and 40 travel near the vehicle 20, the other vehicles 30 and 40 may be triggered to transmit the vehicle information to the vehicle detection information sharing apparatus 10 by being polled by the vehicle 20. Thereafter, the other vehicles 30 and 40 may determine whether risk avoidance information has been acquired from the vehicle detection information sharing apparatus 10 (step S302). Upon determining that risk avoidance information has not been acquired (step S302; NO), the other vehicles 30 and 40 may bring the process to an end. Upon determining that risk avoidance information has been acquired (step S302; YES), the other vehicles 30 and 40 may perform control based on the risk avoidance information (step S303).

As described above, according to the example embodiment, detection information related to an obstacle detected on a road by the own vehicle (one vehicle) is shared with other vehicles. This make it possible to provide another vehicle subjected to risk by the detected obstacle with effective risk avoidance information corresponding to a level of the risk.

MODIFICATION EXAMPLE

The above example embodiment describes an example in which the detection information on the obstacle obtained by the vehicle 20 is shared with the other vehicle, as the risk avoidance information, by the vehicle detection information sharing apparatus 10. The vehicle detection information sharing system is not limited to such an example. The vehicle 20 may be configured to perform the operations of the detection information acquiring unit 12, the vehicle information acquiring unit 11, the risk value calculator 13, the information transmitter 14, and the storage 15 in the vehicle detection information sharing apparatus 10.

Figure 8:
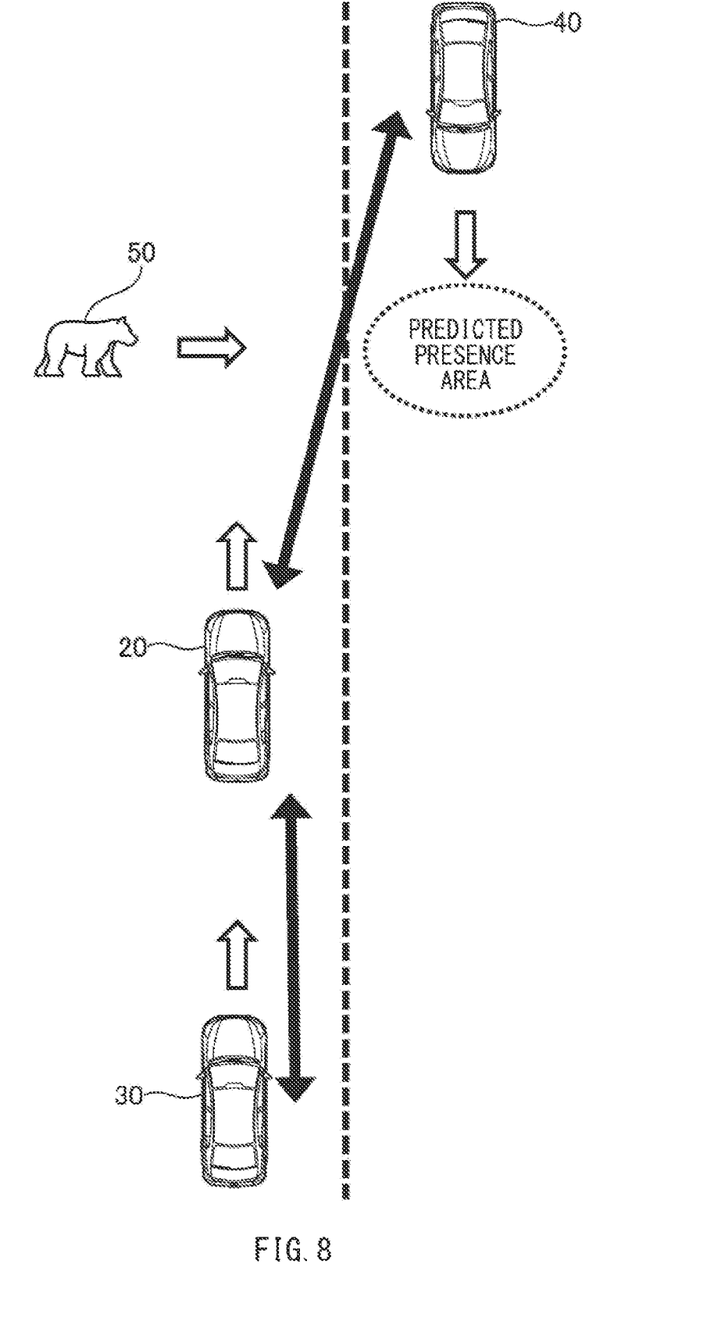
FIG. 8 is an explanatory diagram illustrating an outline configuration of a vehicle detection information sharing system according to a modification example of one example embodiment of the technology.

For example, as illustrated in FIG. 8, in a case where the vehicle 20 detects the obstacle, the vehicle 20 may directly acquire the vehicle information from the other vehicles 30 and 40, and the vehicle 20 may perform the calculation of the risk value based on the detection information and the vehicle information, and the transmission of the risk avoidance information.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

Each of the detection information acquiring unit 12, the vehicle information acquiring unit 11, the risk value calculator 13, and the information transmitter 14 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the detection information acquiring unit 12, the vehicle information acquiring unit 11, the risk value calculator 13, and the information transmitter 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the detection information acquiring unit 12, the vehicle information acquiring unit 11, the risk value calculator 13, and the information transmitter 14 illustrated in FIG. 2.

The invention claimed is:

1. A vehicle detection information sharing system comprising:
    a detection information acquiring unit configured to i) communicate with a first vehicle traveling on a road and ii) acquire, from the first vehicle, detection information on an obstacle detected by the first vehicle;
    a vehicle information acquiring unit configured to i) communicate with a second vehicle which is traveling on the road and within an area including the obstacle and ii) acquire, from the second vehicle, vehicle information of the second vehicle;
    a risk degree calculator configured to calculate a risk degree between the second vehicle and the obstacle based on i) the detection information on the obstacle from the first vehicle and ii) the vehicle information of the second vehicle, the risk degree being a degree of risk that arises between the second vehicle and the obstacle, the vehicle information of the second vehicle indicating whether a third vehicle is present around the second vehicle; and
    an information transmitter configured to transmit, to the second vehicle, one of risk avoidance instructions corresponding to the risk degree between the second vehicle and the obstacle, and control the second vehicle to execute the one of the risk avoidance instructions to avoid the risk that arises between the second vehicle and the obstacle,
    wherein the risk avoidance instructions include (1) a first instruction to force the second vehicle to drive a brake of the second vehicle to stop the second vehicle, and (2) a second instruction to control a display of the second vehicle to display a message,
    wherein the risk degree calculator is configured to calculate the risk degree i) as a first predetermined value based on the vehicle information of the second vehicle indicating that the third vehicle is present around the second vehicle and ii) as a second predetermined value based on the vehicle information of the second vehicle indicating that the third vehicle is not present around the second vehicle, the second predetermined value being lower than the first predetermined value,
    wherein the information transmitter is configured to (1) control the second vehicle by transmitting the first instruction to the second vehicle as the one of the risk avoidance instructions when the risk degree is the first predetermined value, and (2) control the second vehicle by transmitting the second instruction to the second vehicle as the one of the risk avoidance instructions when the risk degree is the second predetermined value,
    wherein the second vehicle comprises a plurality of second vehicles,
    wherein the vehicle information acquiring unit is configured to acquire corresponding vehicle information on each of the second vehicles,
    wherein the risk degree calculator is configured to calculate risk degrees respectively for the second vehicles on a basis of the detection information and the corresponding vehicle information, each of the risk degrees being a degree of risk that arises between the each of the second vehicles and the obstacle, and
    wherein the information transmitter is configured to transmit risk avoidance information to the second vehicles in a descending order of the risk degrees such that the risk avoidance information is transmitted to one of the second vehicles before another one of the second vehicles based on determining that the one of the second vehicles has a higher degree of risk than the another one of the second vehicles has.

2. The vehicle detection information sharing system according to claim 1, wherein the risk degree calculator is configured to
    generate, on the basis of the detection information, on-road risk information attributable to the obstacle being present on the road, and generate, on the basis of the vehicle information, vehicle risk information specific to the second vehicle and attributable to a feature of the second vehicle and a position of the second vehicle on the road, and calculate the risk degree on a basis of the on-road risk information and the vehicle risk information.

3. The vehicle detection information sharing system according to claim 2, wherein, in a case where the obstacle is a movable obstacle including an animal, the risk degree calculator is configured to generate the on-road risk information to include information related to a predicted presence area including a predicted future position of the movable obstacle.

4. The vehicle detection information sharing system according to claim 3, wherein the detection information includes an image captured by an onboard camera of the first vehicle to include the obstacle.

5. The vehicle detection information sharing system according to claim 2, wherein the detection information includes an image captured by an onboard camera of the first vehicle to include the obstacle.

6. The vehicle detection information sharing system according to claim 1, wherein the detection information includes an image captured by an onboard camera of the first vehicle to include the obstacle.

7. The vehicle detection information sharing system according to claim 1,
wherein the vehicle information further includes a model year of the second vehicle, and
wherein the risk degree calculator is configured to calculate the risk degree such that the risk degree becomes higher as the model year of the second vehicle becomes older.

8. The vehicle detection information sharing system according to claim 7,
wherein the vehicle information further includes a weight of the second vehicle, and
wherein the risk degree calculator is configured to calculate the risk degree such that the risk degree becomes higher as the weight of the second vehicle increases.

9. A vehicle detection information sharing system comprising circuitry configured to:
communicate with a first vehicle traveling on a road to acquire detection information on an obstacle detected by the first vehicle;
communicate with a second vehicle which is traveling on the road and within an area including the obstacle to acquire, from the second vehicle, vehicle information of the second vehicle traveling on the road;
calculate a risk degree between the second vehicle and the obstacle based on i) the detection information on the obstacle from the first vehicle and ii) the vehicle information of the second vehicle, the risk degree being a degree of risk that arises between the second vehicle and the obstacle, the vehicle information of the second vehicle indicating whether a third vehicle is present around the second vehicle; and
transmit, to the second vehicle, one of risk avoidance instructions corresponding to the risk degree between the second vehicle and the obstacle, and control the second vehicle to execute the one of the risk avoidance instructions to avoid the risk that arises between the second vehicle and the obstacle,
wherein the risk avoidance instructions include (1) a first instruction to force the second vehicle to drive a brake of the second vehicle to stop the second vehicle, and (2) a second instruction to control a display of the second vehicle to display a message,
wherein the circuitry is configured to calculate the risk degree i) as a first predetermined value based on the vehicle information of the second vehicle indicating that the third vehicle is present around the second vehicle and ii) as a second predetermined value based on the vehicle information of the second vehicle indicating that the third vehicle is not present around the second vehicle, the second predetermined value being lower than the first predetermined value,
wherein the circuitry is configured to (1) control the second vehicle by transmitting the first instruction to the second vehicle as the one of the risk avoidance instructions when the risk degree is the first predetermined value, and (2) control the second vehicle by transmitting the second instruction to the second vehicle as the one of the risk avoidance instructions when the risk degree is the second predetermined value,
wherein the second vehicle comprises a plurality of second vehicles,
wherein the vehicle information acquiring unit is configured to acquire corresponding vehicle information on each of the second vehicles,
wherein the risk degree calculator is configured to calculate risk degrees respectively for the second vehicles on a basis of the detection information and the corresponding vehicle information, each of the risk degrees being a degree of risk that arises between the each of the second vehicles and the obstacle, and
wherein the circuitry is configured to transmit risk avoidance information to the second vehicles in a descending order of the risk degrees such that the risk avoidance information is transmitted to one of the second vehicles before another one of the second vehicles based on determining that the one of the second vehicles has a higher degree of risk than the another one of the second vehicles has.

10. The vehicle detection information sharing system according to claim 9,
wherein the vehicle information further includes a model year of the second vehicle, and
wherein the circuitry is configured to calculate the risk degree such that the risk degree becomes higher as the model year of the second vehicle becomes older.

11. The vehicle detection information sharing system according to claim 10,
wherein the vehicle information further includes a weight of the second vehicle, and
wherein the circuitry is configured to calculate the risk degree such that the risk degree becomes higher as the weight of the second vehicle increases.

* * * * *